US012594520B2

(12) United States Patent
Kleinhans et al.

(10) Patent No.: US 12,594,520 B2
(45) Date of Patent: Apr. 7, 2026

(54) REMOVAL OF PART OF A PARTICLE COLLECTION DEVICE

(71) Applicant: EOS GMBH ELECTRO OPTICAL SYSTEMS, Krailling (DE)

(72) Inventors: Ulrich Kleinhans, Prittriching (DE); Philip Stroebel, Weidenbach (DE); Christoph Schmutzler, Germering (DE); Marbod Kindermann, Munich (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 241 days.

(21) Appl. No.: 18/039,622

(22) PCT Filed: Dec. 14, 2021

(86) PCT No.: PCT/EP2021/085782
§ 371 (c)(1),
(2) Date: Jun. 23, 2023

(87) PCT Pub. No.: WO2022/129105
PCT Pub. Date: Jun. 23, 2022

(65) Prior Publication Data
US 2024/0058737 A1 Feb. 22, 2024

(30) Foreign Application Priority Data

Dec. 18, 2020 (DE) .......................... 102020134299.3

(51) Int. Cl.
*B01D 46/90* (2022.01)
*B01D 46/48* (2006.01)
(52) U.S. Cl.
CPC ............. *B01D 46/90* (2022.01); *B01D 46/48* (2013.01)

(58) Field of Classification Search
CPC .... B01D 46/90; B01D 46/48; B01D 46/0091; B01D 46/0093; B01D 46/0086;
(Continued)

(56) References Cited

U.S. PATENT DOCUMENTS 4,353,722 A * 10/1982 Berz .................. B01D 46/2411
55/474
2014/0287080 A1* 9/2014 Scott ..................... B29C 64/364
29/426.1
(Continued)

FOREIGN PATENT DOCUMENTS

CN 109045855 A 12/2018
CN 109248508 1/2019
(Continued)

OTHER PUBLICATIONS

Translation of DE102019132349A1, accessed Jul. 10, 2025 (Year: 2021).*
(Continued)

*Primary Examiner* — Jennifer Dieterle
*Assistant Examiner* — Phillip Y Shao
(74) *Attorney, Agent, or Firm* — Polsinelli PC

(57) ABSTRACT

Disclosed is a method for the removal of a part of a particle collecting device. The part is loaded with at least highly flammable particles and is removed from a process gas cleaning device of an additive manufacturing device by providing an inert gas which substantially encloses the particles, then removing the part of the particle collecting device from the process gas cleaning device, wherein the particles remain enclosed in the inert gas.

20 Claims, 6 Drawing Sheets

(58) Field of Classification Search
CPC .......... Y02P 10/25; B22F 10/77; B22F 12/70;
B33Y 40/00
See application file for complete search history.

(56) References Cited

U.S. PATENT DOCUMENTS

| | | |
|---|---|---|
| 2018/0244034 A1 | 8/2018 | Sutcliffe et al. |
| 2022/0362691 A1 | 11/2022 | Radermacher et al. |

FOREIGN PATENT DOCUMENTS

| | | |
|---|---|---|
| DE | 102008060600 | 4/2010 |
| DE | 102012004587 | 9/2013 |
| DE | 102014207160 | 10/2015 |
| DE | 102019132349 | 6/2021 |
| DE | 102020112861 | 7/2021 |
| JP | H0416209 | 1/1992 |

OTHER PUBLICATIONS

International Search Report Application No. PCT/EP2021/085782,
dated Mar. 25, 2022, 2 pages.
European Communication pursuant to rule 94(3), Third Office
Action, Application No. 21844200.2, dated Jul. 21, 2025, 4 pages.

* cited by examiner

FIG 1

FIG 2
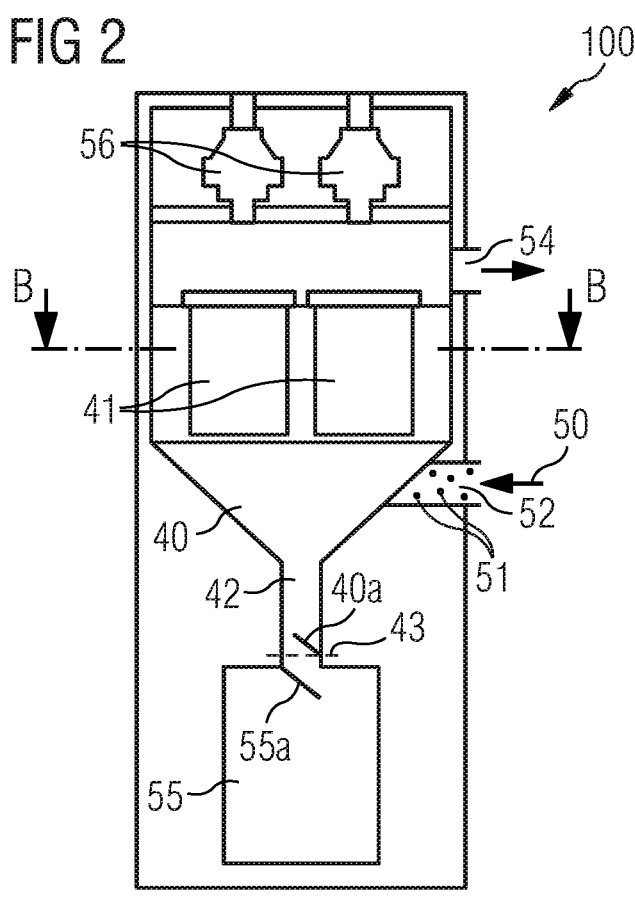
FIG 3   B-B
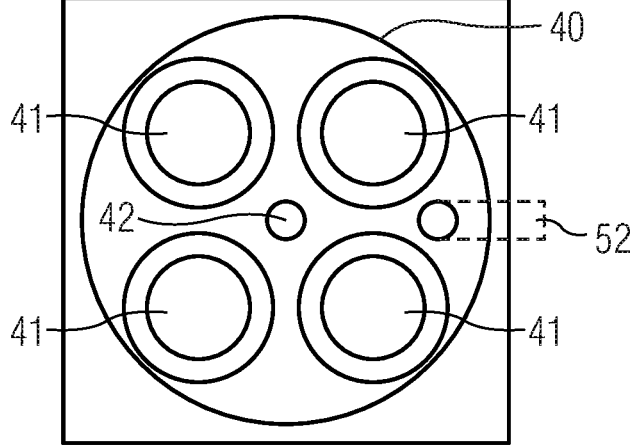

REMOVAL OF PART OF A PARTICLE COLLECTION DEVICE

TECHNICAL FIELD OF THE INVENTION

The present invention relates to a method for removing a part of a particle collecting device, to a process gas cleaning device, to an inerting device as well as to a machine park.

BACKGROUND OF THE INVENTION

When manufacturing prototypes, and now also in mass production, additive manufacturing processes are becoming increasingly important. In general, the term "additive manufacturing processes" should be understood to mean those manufacturing processes in which, usually based on digital 3D construction data, a manufactured product or component is built by depositing material. The build usually occurs by applying a build material in layers and selectively consolidating it. A synonym for additive manufacturing which is also often used is the term "3D printing"; the manufacture of models, samples and prototypes with additive manufacturing processes is often referred to as "rapid prototyping", the manufacture of tools as "rapid tooling" and the manufacture of mass produced items as "direct manufacturing".

The selective consolidation of the build material is frequently carried out by the repeated application of thin layers of the generally powdered build material one on top of the other and consolidating it at the locations which are to form part of the manufactured product following its manufacture by means of localized irradiation using, for example, light and/or heat and/or beams of particles. An example of a process operated with irradiation is "Laser Powder Bed Fusion" or "Selective Laser Melting". The grains of powdered build material are partially or completely melted during consolidation with the aid of the energy applied locally at this location by means of the irradiation. After cooling, these powdered grains are then connected together into the shape of a solid body.

During manufacture of this type, it is often necessary for a process gas to be fed through the process chamber for the purposes of inerting, cooling or discharge (in particular with a fan). The process gas, which emerges then, usually entrains particles of the build material and/or particles generated by the process. In particular, when using metallic build materials, metal condensates which are generated are sometimes highly reactive and even at room temperature, they can react with small quantities of oxygen in the air and release large amounts of heat.

In order to avoid unwanted contamination, for example, in order to counteract the gradual contamination of the process chamber and/or of the fan, it is necessary to filter the process gas after it has exited the process chamber. However, because of the high reactivity of the particles, in the region of filters or collection points at which the particles entrained in the process gas collect, uncontrolled metal or filter fires or dust explosions may occur. This risk is increased if, for example, that collection point or filter chamber is opened in order to change the collecting container or filter, whereupon the probability of a reaction occurring is increased because of the increased supply of oxidation means, for example oxygen in the air, associated therewith.

SUMMARY OF THE INVENTION

The aim of the present invention is to enable safer removal of parts of a particle collecting device which is burdened with reactive particles.

In this regard, the invention concerns the field of additive manufacturing, wherein this manufacture is carried out in a (closed) process chamber through which a process gas is passed, which is then cleaned or filtered. In this case, the term "process gas" should be understood to mean a gas which is discharged, in particular extracted, from a process chamber and which, depending on the manufacturing process, may also consist of or comprise an inert gas. The process gas may contain both unconsolidated fractions of a build material as well as side products of the process, such as condensates, for example metal condensates, or spatters. Components of this type, which are entrained in the process gas, are subsumed under the term "particles". As already described, the particles are at least highly flammable, or even more reactive. This means that because of their small grain size, they are at least so reactive that, with oxygen from the environment, they could ignite even upon brief contact with a source of ignition, by heating with an external heat source or even by a small amount of mechanical activation such as impacts, vibrations, friction on the particles between themselves or the like. In particular, the particles are pyrophoric particles, i.e. particles which (when finely divided) react so strongly with oxygen even at room temperature and in ambient air that the materials smoulder or even catch fire. This means that the particles are spontaneously combustible, in particular at room temperature and under normal environmental conditions.

The aforementioned method describes the removal of a part of a particle collecting device, which part is loaded with such at least highly flammable particles. The part of the particle collecting device in this regard is then removed from a process gas cleaning device of an additive manufacturing device. The method comprises at least the following steps. In one step, an inert gas which substantially encloses the particles is provided. In a further step, the part of the particle collecting device is removed from the process gas cleaning device, wherein the particles remain enclosed in the inert gas.

The process gas cleaning device comprises all of the components which are necessary for cleaning up the process gas. In particular, the process gas containing the particles is fed to it by means of a dirty gas infeed and the gas cleaned in it is recycled to the additive manufacturing device by means of a clean gas outlet.

The particle collecting device comprises at least the components or parts of the process gas cleaning device on which the particles collect during operation. This in particular may include filters or filter units and/or collecting containers for the particles, wherein in addition, separating units such as cyclones, gravity separators, inertial separators or impact separators may be included in the particle collecting device. Thus, after a period for cleaning the process gas, particles become deposited on parts of the particle collecting device, so that the parts become burdened with particles. This means that particles become adhered to a filter unit, for example, or a collecting container becomes filled with particles.

In general, an "inert gas" describes a gas which does not participate in specific chemical processes. In the context of the invention, this in particular means that the inert gas does not react with the particles which have been separated out. Because in this context, the process gas is also an inert gas, the provision of the inert gas can, for example, be carried out in a simple manner by providing the process gas.

As an alternative or in addition, however, the inert gas may also be provided by means of an inerting device, as will be described below in detail.

In principle, as an alternative to an inert gas, any means for reducing the risk of fire is suitable, such as other inert materials, extinguishing agents, reagents, wetting agents, oils, foam, dry ice or the like, for example. However, considering the other downstream stages of the process such as, for example, reprocessing of individual components or cleaning the process gas cleaning device of contamination by other inert materials, the use of inert gases has been shown to be the most suitable.

Because the particles are "substantially" enclosed in the inert gas, this means that the enclosure may, for example, be a gas-tight enclosure in a container. However, the enclosure may also, for example, be carried out by means of an inert gas cloud which, although it does not surround the particles in a completely gas-tight manner, it sheaths them and therefore protects them from the influence of other reactive gases. In other words, by means of the inert gas, at least one protective sheath or buffer zone is produced around the part of the particle collecting device which is loaded with particles.

The removal of the part of the particle collecting device is in particular a sub-step in changing these components. This means that after removal, the part is replaced with a similar or identical part, or even with the same but reprocessed part.

In order to enable safe removal, the particles remain enclosed in the inert gas during removal. In particular, the enclosure is maintained until the part has been dealt with safely. This means that in the case of a gas-tight enclosure, this is maintained; in the case of an enclosure which is not gas-tight, the buffer zone produced from inert gas must continue to be provided. The latter occurs, for example, by means of an inerting device in accordance with the invention which will be described in more detail below.

Preferably, the process gas cleaning device comprises a removable collecting container for at least highly flammable particles which are separated out in the process gas cleaning device. In this regard, the collecting container preferably has a first bulkhead which is impermeable to the ingress of gas and/or particles, which is configured to enclose the particles with an inert gas upon removal of the collecting container.

Thus, the collecting container is preferably a part of the particle collecting device which is to be removed. The collecting container is a vessel for securely receiving the particles separated in the process gas cleaning device. This means that the collecting container preferably receives a major proportion of the separated, at least highly flammable particles, particularly preferably 90% and more thereof. To this end, the particles are guided with suitable means such as a collecting hopper, for example, into the collecting container.

The fact that the collecting container "can be removed" means that it and the process gas cleaning device preferably comprise complementary coupling pieces which together form a gas-tight and particle-tight friction fit and/or interlocking fit when they are connected appropriately. This connection can, however, be released with a few movements so that the collecting container can advantageously easily be separated from the process gas cleaning device.

In order to enclose the particles with the inert gas, the collecting container has the at least first bulkhead which is impermeable to the ingress of gas or particles. In general, the term "bulkhead" should be understood here to mean a sealing device. It may, for example, be configured as a gas-tight flap, gas-tight iris diaphragm, gas-tight slide valve or the like. Because it is at least impermeable to the ingress of gas, this means that it may, for example, additionally have a pressure relief valve in order to enable the inert gas to be released from the collecting container until the pressure has equalized. In this case in particular, the process gas serves as the inert gas. The collecting container with the particles enclosed in the inert gas in a gas-tight manner may be taken to secure storage, to an external passivation device or to a device for preparing the particles and/or the collecting container. During transport, any risk of ignition of the particles is advantageously substantially reduced or even completely averted.

The fact that the collecting container is closed during or prior to removal means, for example, that the bulkhead is closed in a step, which is prior to removal. As an alternative, the closing—and preferably also the opening when reinserting the collecting container—is carried out automatically, in particular by an appropriate mechanism, or electrically, for example by means of a common actuator, at the same time as the removal procedure. In this regard, however, it is ensured that the inert gas in the collecting container is enclosed and no exchange of gas with the atmosphere in the environment occurs.

As already mentioned above, the particles are also deposited on filter units of a process gas cleaning device. Correspondingly, these parts of the particle collecting device must also be removed when required and possibly changed. The aforementioned inerting device serves to substantially reduce or even completely avert the risk of ignition of the at least highly flammable particles adhering to the filter unit. To this end, the inerting device comprises a first connecting piece adapted for the first filter unit and an inert gas supply for flushing the first filter unit with inert gas when removing the filter unit.

If the process gas cleaning device comprises more filter units than the first filter unit, then usually, all of the filter units are configured in an identical manner. The difference between the first filter unit and the second filter unit therefore only concerns the steps of the process during removal, during which the first connecting piece is connected to the first filter unit and the other (second) filter units are covered with second connecting pieces. Therefore, the first filter unit and the second filter unit together will hereinafter simply be described as the "filter units" unless they have to be distinguished from each other. A filter unit comprises one or more filter elements as well as, preferably, a holder for it with which the filter unit can additionally be inserted in an appropriate seat in the process gas cleaning device. The filter elements are structurally configured in a manner such that they can allow the gas to pass through, but retain the particles. To this end they have a filter medium, preferably a filter fabric and/or filter fleece. In particular, the process gas cleaning device comprises a plurality of filter units which are preferably identical in build and which form a filter assembly.

The first connecting piece of the inerting device is adapted to the filter unit and is connected to the filter unit so that it can be used as intended. This means that its dimensions and/or the arrangement of its components are appropriate for the filter unit. The inert gas supply provides the inert gas and therefore can flush the filter unit with the inert gas when operating. It is described in detail below. The continuous flushing of the filter unit with inert gas throughout the entire removal process produces a cloud of inert gas around the filter unit, which encloses the adhering particles and protects them from reactive gases in the environment.

The inerting device described above is preferably used to remove the filter units of a process gas cleaning device in accordance with the invention. In principle, however, the inerting device is an independent concept. Both aspects of the invention, however, serve a synergistic purpose of making the removal of parts of the particle collecting device safer and therefore serve the same core purpose of providing and maintaining protection by an inert gas in order to remove a part of the particle collecting device.

The machine park mentioned above comprises an inerting device in accordance with the invention. Preferably, it additionally comprises at least one additive manufacturing device with a process gas cleaning device as described above, and preferably a plurality of collecting containers. Because in such a machine park the collecting containers and preferably also the inerting device can be used for multiple additive manufacturing devices, particularly advantageous economies of scale can be achieved. This is because the collecting containers could, for example, be prepared and are exchangeable between process gas cleaning devices with identical coupling pieces. However, for planning purposes, the collecting containers do not have to be changed at the same time. In a similar manner, the inerting device may also be used for changing identical or sufficiently similar filter units of a plurality of additive manufacturing devices.

Further particularly advantageous embodiments and further developments of the invention will become apparent from the dependent claims as well as from the description below, wherein the independent claims of one category of claims may also be developed further in similar manner to the dependent claims and exemplary embodiments of another category of claims and in particular, individual features of different exemplary embodiments or variations may be combined to form new exemplary embodiments or variations.

As already described above, the particle collecting device preferably comprises at least one filter unit on which—after a period of process gas cleaning—the particles adhere and which are flushed with the inert gas during removal. In this regard, flushing with the inert gas has preferably already been carried out before removal. This means that prior to removal, flushing of the filter unit and therefore the protective inert gas cloud has already been established, or the inert atmosphere is maintained in the lower region of the filter chamber.

Preferably, during the entire removal process, a gas quality is determined and flushing with the inert gas is adjusted as a function of the gas quality. This means that a homogeneous inert gas cloud which protects the entire filter unit can be provided.

Flushing with the inert gas is preferably carried out with the aid of an inerting device which is appropriate for the filter unit. The inerting device or the particle collecting device preferably comprises a gas sensor for measuring the gas quality or the concentration of the inert gas(es) and/or the concentration of oxygen. In addition, the inerting device preferably comprises a flow regulator for regulating the flow of gas as a function of the gas quality. In this regard, the gas quality may, for example, be determined by random sampling at irregular intervals. However, the gas quality is preferably determined at regular intervals, particularly preferably continuously. Flushing is preferably also dependent on a temperature and/or a pressure measured in the filter unit. In order to determine these values, the inerting device preferably has a temperature sensor and/or a manometer. If a specified threshold is exceeded, a warning signal is preferably issued. Preferably, the threshold for adjustment or for a warning is a determined $O_2$ reference value of a maximum of 10 percent by volume, particular a maximum of 5 percent by volume, more particularly preferably a maximum of 3 percent by volume.

Preferably, the first connecting piece of the inerting device has a cover, which closes an opening in the filter unit when used as intended, preferably in a gas-tight manner. In this regard, the cover is preferably self-sealing or has an appropriate seal. This reduces or prevents oxygen from gaining ingress through the opening or inert gas from escaping, so that the filter elements can be properly flushed.

Furthermore, the first connecting piece preferably comprises a locking unit. The locking unit is configured in a manner such that it connects the connecting piece securely, particularly preferably rigidly to the filter unit to be removed when used as intended. In this manner, on the one hand, the gas-tight seal of the opening of the filter unit is ensured, on the other hand, a direct contact of the filter unit by personnel is avoided because in this manner, the filter unit can be removed by means of the first connecting piece. This additionally increases the security and the ergonomics for personnel. To this end, the locking unit preferably comprises a plurality of locking means, which, when used as intended, produce a friction fit and/or an interlocking fit with the filter unit, which can be released when required.

The particle collecting device preferably comprises a collecting container which—after a period of process gas cleaning—is full of particles and in which the inert gas and the particles are enclosed in a gas-tight manner during removal. This means that the particles are sealed off for removal in the collecting container, as described above, from oxidizing agents—for example ambient oxygen and other reactive gases, aerosols or liquids.

The removal of the collecting container is preferably also carried out at least in part during a separation procedure or a particle separation procedure. In the case, for example, when a procedure for a cleaning one or more filter elements cannot be moved to a point in time at which the emptied collecting container has been docked again on the particle collecting device in a gas-tight manner, the particles can preferably be collected in an intermediate container and the process gas cleaning device can still operate without interruptions. In this manner, advantageously, the additive manufacturing device can also be operated further without interruptions. The removal of the collecting container is therefore temporally independent of the operation of the machine and associated cleaning procedures. Cleaning of the filter units can therefore be carried out when the collecting container has been removed or during removal of the collecting container.

The intermediate container is therefore an auxiliary reservoir which is comprised in the process gas cleaning device. In this regard, it is preferably configured in a manner such that it can accommodate at least the quantity of particles which typically drop out when changing over the collecting container. The intermediate container may be configured as an additional chamber or cavity of the process gas cleaning device but, for example, it may also be produced at least in part by the volume of a collecting hopper or the like.

The inert gas preferably has a nitrogen fraction and/or argon fraction of at least 45%, particularly preferably of at least 90%, more particularly preferably of at least 99%. In addition to argon and nitrogen, however, other inert gases, for example helium or neon, or mixtures thereof may be used.

By means of these gas fractions, inerting of the particles is possible in principle. In this regard, higher fractions of nitrogen or argon (or of another inert gas) enable better inerting but, for example, this has to be balanced against the gas consumption and other conditions. Particularly preferably, the inert gas has the same com-position as the process gas. The use of nitrogen has the advantage that nitrogen is a substantial component of the ambient air and therefore can be used substantially without risk for flushing by means of the inerting device.

After removal, the part of the particle collecting device and/or the collected particles is preferably disposed of or recycled.

Particles cleaned from or collected from a filter unit can preferably be used (directly) as a build material in a (fresh) manufacturing process or as condensates for other manufacturing processes. In this regard, for example, the metal condensate which is collected in the collecting container after cleaning the filter may be recycled, if appropriate without cleaning. This is in particular possible in the case of the use of metal filters with untreated surfaces which are described in more detail below. As an alternative, the collected particles are preferably passivated with a suitable passivation means prior to their disposal.

The collecting containers too may be reutilised after emptying them and after cleaning, if necessary. However, before they are recoupled to a process gas cleaning device, they are preferably initially filled with the respective process gas in order to avoid compromising the process gas atmosphere in the process gas cleaning device or the additive manufacturing device.

Preferably again, the filter units may if necessary undergo a more thorough cleaning and recycling outside the process gas cleaning device and be prepared for further use.

Prior to being recycled or disposed of, the filter units are preferably permanently passivated and placed in a secure storage container. Lime, sand, glass flour, (blown) glass spheres are preferably used as the passivation means. As an alternative, the filter units are preferably fully oxidized in a secure container in the presence of oxygen until they are no longer spontaneously combustible or are only slightly combustible.

The machine park preferably has a common passivation station for the aforementioned passivation steps.

Components which have been compromised too much, for example filters which can no longer be cleaned or particles which have become unusable, are preferably disposed of in the correct manner.

The process gas cleaning device preferably comprises a separation opening and a gas-tight second bulkhead which is configured to close the separation opening upon removal of the collecting container. This ensures that the process gas atmosphere in the process gas cleaning device as well as in the additive manufacturing device is maintained. In addition, in this manner, the filter elements—also upon removal of the collecting container after completion of the additive build process—remain in the inert atmosphere of the process gas. Otherwise, with the ingress of even small quantities of ambient air, unwanted reactions of the particles on the filter elements could occur. In addition, this prevents the flammable particles from leaving the process gas cleaning device. The gas-tight second bulkhead may, for example, be configured in similar manner to the gas-tight first bulkhead.

In the case of the inerting device, preferably, at least the first connecting piece is movable with respect to the process gas cleaning device at least in one region, and particularly preferably, the inert gas is supplied by means of a flexible tube or a gas cartridge.

In principle, the first connecting piece is as freely movable as possible. The formulation "movable in one region" takes into account, for example when a flexible tube is used, the limited length of tubing within which the first connecting piece can be used. In this regard, the flexible tube is connected to a gas bottle, for example, a domestic gas connection, an intermediate storage (tank), a buffer or the like. As an alternative, the inert gas is supplied by means of a gas cartridge which, for example, can be mounted to the first connecting piece, whereupon the inert gas supply is freely movable. In this regard, the gas cartridge is preferably designed in a manner such that it provides a sufficient quantity of inert gas for the removal of a filter unit. Particularly preferably, it is configured in a manner such that it provides a sufficient quantity of inert gas for the removal of all of the filter units of the process gas cleaning device. This means that the quantity of inert gas is preferably sufficient for typical inerting periods of 5 minutes, particularly preferably 10 minutes, more particularly preferably 60 minutes.

The inerting device preferably has an automatic cut-off which stops flushing with the inert gas, preferably after at most 30 minutes, particularly preferably after at most 20 minutes, more particularly preferably after at most 10 minutes. The cut-off may in this regard comprise a time switch, which, for example, stops the supply of gas after 999 seconds. In this manner, inert gas is advantageously saved. In addition, the automatic cut-off ensures that no inert gases escape which are harmful in large quantities such as argon, for example.

In order to adjust or regulate the volumetric flow rate of the inert gas, the inert gas supply preferably has additional components such as a pressure reduction valve, a manual or preferably electronic control valve, a flow limiter, a stopcock or the like.

Preferably, the inerting device comprises an outflow outlet which has a number of outflow openings. In this regard, the number and the arrangement of the outflow openings is matched to the geometry of the filter unit. This means that the outflow outlet is also designed with outflow openings which correspond to the shape and dimensions of the filter unit in order to obtain flushing of all regions of the filter unit which is as homogeneous as possible. In this regard, the outflow openings may be distributed regularly or in an irregular manner, for example, over the outflow outlet. The outflow outlet here therefore preferably has a cylindrical or conical piece of pipe which, for example, has holes distributed over its length which act as outflow openings. Alternatively, the outflow openings may preferably be configured as a microporous structure, for example in a sintered element.

Preferably, the particle collecting device comprises at least one second filter unit which is at least periodically isolated from an ambient atmosphere during removal of the first filter unit.

Accordingly, the inerting device for at least one second filter unit of a process gas cleaning device, which second filter unit is loaded with at least highly flammable particles, preferably comprises a gas-tight second connecting piece adapted for the second filter unit for at least periodically isolating the second filter unit against an ambient atmosphere during removal of the first filter unit.

The second connecting pieces are preferably in the form of passive covers in order to reduce or prevent the ingress of oxygen directly into the still-installed filter units or indirectly via the opening of the removed filter unit. In an operative position, a passive cover, i.e. a cover which maintains an inert atmosphere in the filter chamber, covers a withdrawal opening in the filter chamber or the openings of the remaining filter units in a substantially gas-tight manner. Preferably, it forms a friction fit and/or an interlocking fit with the withdrawal opening, which can be released when required. The passive cover may comprise a suitable seal on the underside and handles for easy manipulation on the top. Preferably, the inerting device has a number of second connecting pieces, which is equal to the number of filter units of the process gas cleaning device.

The at least one filter unit is preferably configured as a surface filter, particularly preferably as a permanent surface filter (in contrast to a depth or depth-loading filter). The term "permanent filter" should be understood to mean filters which, in contrast to the usual models of filter, can remain in place long-term (over many cycles) and/or permanently during the operation of the process gas cleaning device. In this regard, a permanent filter may be cleaned after a certain period of time, i.e. the filtrate is withdrawn or ejected and therefore filtrate can be removed from the filter pores or from the filter material and/or a filter cake lying on the filter can be removed. A permanent filter must contain a filter material, which has a mechanical strength, which is high enough not to be destroyed or damaged with repeated appropriate cleaning. A preferred example of a permanent surface filter is a metal filter element with a metal mesh or metal screen as the filter material or a filter element with a filter medium produced from glass wool or ceramic. In particular, a filter with a polyester fabric cannot be considered to be a permanent filter at least if it does not have sufficient mechanical and thermal stability and clogs prematurely during use. Preferably, a permanent surface filter can be used for at least 6 months, more preferably at least 1 year, particularly preferably at least 2 years as intended, before it is disposed of or recycled. Advantages of a permanent surface filter may include that a risk of fire by heating dusty filtrate is significantly reduced, for example by good heat conduction of the filter material or because it seldom has to be changed and it can be cleaned under clearly defined, inert conditions. Cleaning may, for example, be carried out by generating a pressure surge against the process gas direction, for example with an inert gas such as nitrogen or argon, and in this manner, the filtrate blocking the pores and/or a filter cake lying on the filter can be removed from the filter and can fall into the collecting container. Good heat conduction of a permanent filter has a positive effect, primarily when the ingress of oxidizing agents, for example oxygen, brought about by any leaks in a system and/or when changing a filter and/or when opening the process chamber, could result in reactions.

In accordance with a preferred filter unit, the permanent filter comprises a ceramic filter element and/or a glass wool filter element as an alternative or as a complement to a metal filter element. A mixture of different filter types (i.e. a metal filter, ceramic filter and glass wool filter) is preferred, depending on the application. In this regard, as an example, the good thermal conductivity of a metal filter may advantageously be combined with a ceramic or glass wool filter. As an example, different filter stages may be formed in one filter.

An additive manufacturing device for the manufacture of a component in an additive manufacturing process preferably comprises a process chamber, a supply device for the application of a build material in layers in the process chamber, an irradiation unit for the selective consolidation of the build material in the process chamber and a process gas cleaning device in accordance with the invention.

A preferred method for the additive manufacture of a component in an additive manufacturing process by means of an additive manufacturing device comprises the following steps:

introducing at least one layer of a build material into a process chamber of the manufacturing device, selectively consolidating the build material in the process chamber by means of an irradiation unit, cleaning a volume (leaving the process chamber and in particular moved in a closed circuit) of a process gas of the additive manufacturing process, preferably by means of a process gas cleaning device in accordance with the invention, and after a number of repetitions of the aforementioned steps, changing a part of a particle collecting device of the process gas cleaning device, which part is loaded with particles, by means of the method for the removal of a part of a particle collecting device in accordance with the invention.

Preferably, a flow rate through an area of the filter unit is at least 0.1 m/s, more preferably 0.3 m/s, particularly preferably at least 0.5 m/s, more particularly preferably at least 1 m/s, and/or at most 5 m/s, particularly preferably at most 3 m/s, more particularly preferably at most 2 m/s.

In this regard, the flow rate designates the mean speed at which the inert gas impacts upon an area or a filter medium of a filter element of the filter unit. In this context, "mean" means that the flow rates, for example because of the geometry or because of deposited particles, might vary locally. They are adjusted or regulated as a function of the total surface area of the filter surface over the supplied volumetric flow of inert gas. The values given have been shown in tests to be particularly suitable. In the case of too high a flow rate, the danger arises that particles will be released or blown down from the filter unit. In contrast, in the case in which the flow rate is too low, sufficient flushing with the inert gas cannot be guaranteed, so that the risk of ignition of the particles increases.

Preferably, a surface area of a filter surface of a single filter unit is at least $0.5$ m$^2$, and preferably at most $5$ m$^2$. Particularly preferably, the filter surface in a filter unit with metal filter elements is approximately $1.7$ m$^2$ and in the case of a filter unit with plastic filter elements, it is approximately $2.4$ m$^2$. The adjustment or regulation of the volumetric flow of the inert gas when flushing a filter unit of this type by means of the inerting device is particularly preferably carried out as a function of the surface area of the filter surface. Depending on the filter surface, the volumetric flow rate is in a range of close to 0 L/min, preferably at least 5 L/min, particularly preferably at least 10 L/min, more particularly preferably at least 20 L/min. The volumetric flow rate is at most 100 L/min. In the case of a filter unit with a plastic filter element and a filter surface area of $2.4$ m$^2$, the volumetric flow rate is particularly preferably approximately 60 L/min. In the case of a filter unit with a metal filter element and a filter surface area of $1.7$ m$^2$, the volumetric flow rate for nitrogen as the inert gas is more particularly preferably approximately 60 L/min (this could vary for other inert gases because of differences in density and viscosity).

In accordance with a preferred process gas cleaning device, the filter unit is disposed in a manner such that a dirty gas side in contact with the process gas to be cleaned is an outer surface (disposed on the outside of the filter unit).

As an alternative or in complementary manner, the filter unit is preferably arranged in the process gas cleaning device in a manner such that a dirty gas side in contact with the process gas to be cleaned is an inner surface of the filter unit (disposed on the inside of the filter). This variation with a dirty gas side on the inside has the advantage that the cleaned condensate remains on the inside of the filter, which results in a reduced risk of fire when changing and therefore a reduced risk to operators in the case of incorrect operation. In addition, during inerting in order to remove the filter unit, the inert gas can be used more effectively (i.e. economically, because a smaller volume is required), in that it is introduced onto the inside of the filter unit.

Preferably, the at least one filter unit of the process gas cleaning device is configured and therefore disposed in the process gas cleaning device in a manner such that cleaning of the filter unit can be carried out in a cleaning operation for the process gas cleaning device which runs in parallel to a build process in the manufacturing device. An "online clean" in this regard is therefore cleaning without interrupting the build job, preferably carried out at a lower pressure than cleaning during an interruption to the build job or between build jobs, and which may be approximately 5 bar. A preferred pressure range for online cleaning is between 2 and 5 bar.

In a preferred method for additive manufacture, cleaning of the filter unit is carried out during the (running) additive manufacturing process, in particular without interrupting the manufacturing process.

In a preferred method for additive manufacture, cleaning of the filter unit is carried out as a function of a pressure difference for the process gas (across the filter unit).

In this regard, a preferred pressure difference is at least 10 mbar, preferably at least 20 mbar, preferably at least 30 mbar, particularly preferably at least 40 mbar. As an alternative or in addition, a cleaning pressure surge for cleaning the filter unit is less than 5 bar, preferably less than 4 bar, preferably less than 3 bar, particularly preferably 2.5 bar. However, this pressure depends on the surface area and the shape of the filter unit. Preferably again, a cleaning pressure surge may be more than 2 or preferably more than 3 bar, in particular 4 bar. Preferably, the process gas cleaning device comprises buffer volumes which absorb the pressure surge.

The method in accordance with the invention for removal of a part of the particle collecting device is preferably carried out after multiple separation procedures or cleaning procedures. Efficient operations are achieved in this manner. In particular, removal or change of the collecting container is carried out as a function of how full the collecting container is after approximately 100 cleaning procedures for cleaning individual filter units. A removal or change of the filter units is carried out after epic) proximately 100 procedures for cleaning the individual filter unit.

BRIEF DESCRIPTION OF THE DRAWINGS

The invention will now be described in more detail again, with reference to the accompanying figures and with the aid of exemplary embodiments. In this regard, in the various figures, the same components are provided with identical reference numerals. The figures are generally not to scale. In the figures:

FIG. 1 shows a diagrammatic, partially sectional view of a device for the additive manufacture of a three-dimensional object, FIG. 2 shows a diagrammatic, partially sectional view (side view) of an exemplary embodiment of a process gas cleaning device in accordance with the invention for filtering a process gas, FIG. 3 shows a diagrammatic sectional view (top view) of FIG. 2.

DETAILED DESCRIPTION OF THE EMBODIMENTS

Figure 1:
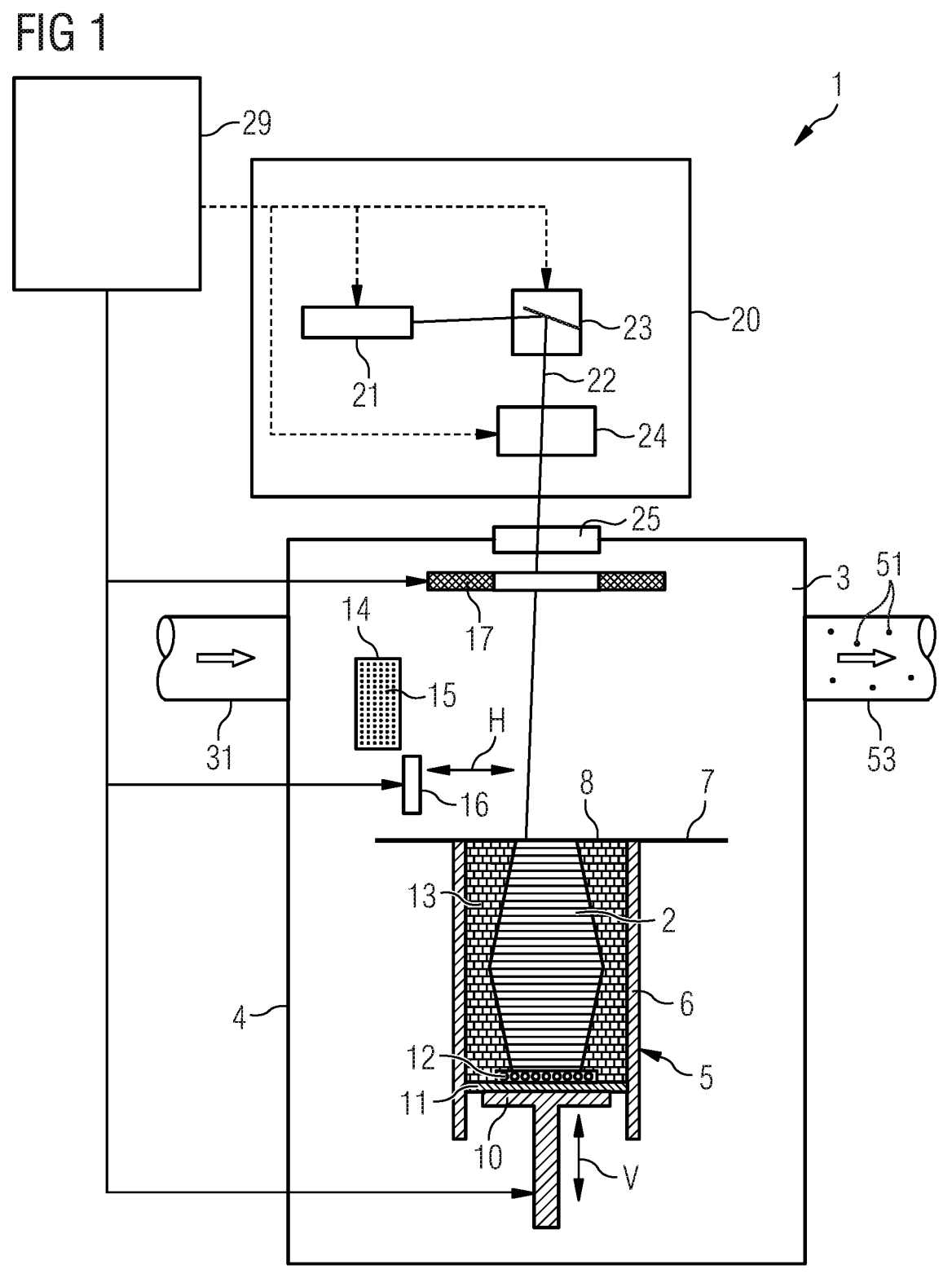
Figure 4:
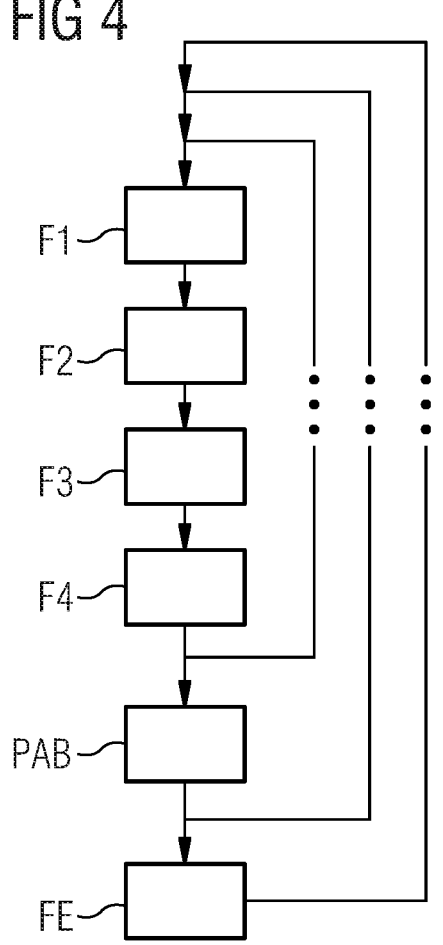
FIG. 4 shows a diagrammatic flow chart of a method for cleaning process gas including an exemplary embodiment of a method for the removal of a collecting container in accordance with the invention and an exemplary embodiment of a method for the removal of filter units in accordance with the invention.

An additive manufacturing device 1 for a three-dimensional object will be described below with reference to FIG. 1. The manufacturing device 1 shown in FIG. 1 is a selective laser melting device 1. In order to construct an object 2, it contains a process chamber 3 with a chamber wall 4.

A container 5, which is open at the top and has a container wall 6, is disposed in the process chamber 3. A working plane 7 is defined by the upper opening of the container 5, wherein the region of the working plane 7 which lies within the opening, which can be used to build the object 2, is designated the build zone 8. In addition, the process chamber 3 comprises a process gas infeed 31 as well as a process gas outlet 53 associated with the process chamber 3.

A support 10 is disposed in the container 5 and can be moved in a vertical direction V, on which a base plate 11 is attached which closes the bottom of the container 5 and therefore forms its floor. The base plate 11 may be a plate which is separate from the support 10 and which is fastened to the support 10, or it may be formed integrally with the support 10. Depending on the powder and process employed, another build platform 12 may be attached to the base plate 11 as a build substrate on which the object is built. The object 2 may also, however, be built on the base plate 11 itself which then acts as the build substrate. FIG. 1 shows the object 2 to be formed in the container 5 on the build platform 12 below the working plane 7 in an intermediate state with a plurality of consolidated layers surrounded by build material 13 which remains unconsolidated.

Furthermore, the laser melting device 1 contains a storage container 14 for a powdered build material 15 which can be consolidated by electromagnetic radiation and a recoater 16 which can be moved in a horizontal direction H for applying the stored build material 15 inside the build zone 8. Preferably, the recoater 16 extends transversely to its direction of movement over the entire region to be coated.

Optionally, a radiant heating system 17 is disposed in the process chamber 3 and serves to heat the applied build material 15. An infrared lamp may be provided as the radiant heating system 17, for example.

The laser melting device 1 furthermore comprises an illuminating device 20 with a laser 21 which produces a laser beam 22 which is deflected via a deflection device 23 and is focused onto the working plane 7 by means of a focusing device 24 via a coupling window 25 which is attached to the top of the process chamber 3 in the chamber wall 4.

Furthermore, the laser melting device 1 comprises a control unit 29 via which the individual components of the laser melting device 1 are controlled in a coordinated manner in order to carry out the build process. As an alternative, the control unit may also be installed partially or completely outside the laser melting device 1. The control unit may contain a CPU the operation of which is controlled by means of a computer program (software). The computer program may be stored remotely from the laser melting device 1 on a storage medium from which it can be loaded into the laser melting device 1, in particular into the control unit.

Preferably, a powdered material is used as the build material 15, wherein the invention is particularly directed towards build materials which form metal condensates. In the context of an oxidation reaction and therefore an associated risk of fire, iron-containing and/or titanium-containing build materials are mentioned in particular, but also copper-containing, magnesium-containing, aluminium-containing, tungsten-containing, cobalt-containing, chromium-containing and/or nickel-containing materials, as well as compounds containing such elements.

In operation, in order to apply a layer of powder, firstly the support 10 is dropped by a height which corresponds to the desired layer thickness. The recoater 16 initially travels to the storage container 14 and takes from it a sufficient quantity of the build material 15 for the application of a layer. Then it travels over the build zone 8, applies powdered build material 15 to the build substrate 12 or a layer of powder which is already present and draws it out to form a layer of powder. The application is carried out over at least the entire cross section of the object 2 to be manufactured, preferably over the entire build zone 8, i.e. the region delimited by the container wall 6. Optionally, the powdered build material 15 is heated to a working temperature by means of a radiant heating system 17.

Next, the cross section of the object 2 to be manufactured is swept by a laser beam 22 so that the powdered build material 15 is consolidated at the positions which correspond to the cross section of the object 2 to be manufactured. In this regard, the grains of powder at these positions are partially or completely melted by the energy introduced by the irradiation, so that after cooling, they are connected together to form a solid body. These steps are repeated until the object 2 has been completed and can be removed from the process chamber 3.

FIG. 2 is a diagrammatic, partially sectional view of a process gas cleaning device 100 for filtering the particles 51 out of a process gas 50. The process gas 50 loaded with particles 51 enters through an infeed 52 into the process gas cleaning device 100. The line which is shown as the infeed 52 comes out of the process chamber 3 from the outlet 53 for the process gas loaded with particles 51 (see FIG. 1). The process gas 50, which enters the process gas cleaning device 100, then flows through the filter chamber 40, which is in the form of a hopper here, which discharges into the collecting container 55. Larger particles 51 are guided from the hopper-shaped edge of the filter chamber 40 into a pipe 42 and finally into the collecting container 55. Lighter particles 51 are filtered out of the process gas 50 by means of a filter assembly which has four filter units 41 in the example shown. The filter units 41 here are substantially cylindrical or barrel-shaped filters 41, however they could also be spherical or cuboids, for example. Above the filter units 41 are cleaning units 56 with gas tanks which can clean the filter units 41 by means of cyclic pressure surges. Particles 51 removed from the filter units 41 fall from the hopper and from the pipe 42 into the collecting container 55. Filtered process gas exits from the clean gas outlet 54 out of the process gas cleaning device 100.

The collecting container has a gas-tight and particle-tight first bulkhead 55a which here is shown as a simple flap. It may also, for example, be configured in the form of an iris diaphragm or the like. In addition, the pipe 42 of the filter chamber 40 leading to the collecting container 55 has a gas-tight and particle-tight second bulkhead 40a (shown diagrammatically). Before the collecting container 55 is removed from the process gas cleaning device 100, both bulkheads 40a, 55a are closed so that neither gas nor particles 51 can escape from the filter chamber 40 or from the collecting container 55. The reactive, i.e. at least highly flammable particles 51 are therefore enclosed in the collecting container 55 under an atmosphere of process gas or inert gas so that a risk of ignition is reduced or averted. Furthermore, the entry of ambient air into the filter chamber 40 is prevented. When the collecting container 55 has been removed, the pipe 42, for example, may act as the intermediate container so that particles 51 which fall in the period during which the collecting container 55 is being changed can be stored intermediately.

The collecting container 55 is connected to the pipe 42 via a coupling mechanism 43 wherein the collecting container 55 and the pipe 42 have complementary coupling pieces. The coupling mechanism 43 can preferably only be separated when both bulkheads 40a, 55a are closed so that the process gas atmosphere is maintained. Particularly preferably, both bulkheads 40a, 55a are automatically closed by means of the coupling mechanism 43 upon removal of the collecting container 55.

The coupling mechanism may take different forms, for example as a commercial bayonet lock, as a commercial dual flap valve or the like.

Preferably, the same coupling mechanism 43 is used in all of the collecting containers 55 or process gas cleaning devices 100 in a machine park, so that the collecting container 55 can be used and changed in a flexible manner in different process gas cleaning devices 100.

The filter chamber 40 may comprise a pressure relief valve. This means that a higher inert gas saturation of the internal gas atmosphere can be obtained, for example because a fraction of oxygen which has penetrated can be forced out or diluted by continuous flooding.

FIG. 3 is a diagrammatic sectional view of FIG. 2. The filter assembly of four surface filters 41 which are configured as filter cartridges can clearly be seen. In addition, the pipe 42 is disposed centrally and which opens into the collecting container 55, and reaching laterally from outside into the filter chamber 40 is the infeed 52 for the process gas 50.

FIG. 4 shows a diagrammatic flowchart for a method for process gas cleaning. It comprises an exemplary embodiment of a method in accordance with the invention for the removal of a collecting container PAB and an exemplary embodiment of a method in accordance with the invention for the removal of filter units, FE.

As already described above, during the method for cleaning process gas, process gas 50 is fed into the filter chamber 40. In this regard, larger particles can fall directly into the collecting container 55, whereas lighter particles 50 become deposited on the filter units 41. In a step F1, cleaning of a first filter unit 41 is carried out by means of a pressure surge. In steps F2, F3 and F4, cleaning of the second, third and fourth filter units 41 take place in an analogous manner. The cleaning steps F1, F2, F3, F4 can in principle be carried out at the same time, but preferably, they are carried out sequentially and with intermediate pauses.

After a specified number of cleaning steps F1, F2, F3, F4 or after the collecting container 55 has been filled, the method PAB for the removal of the collecting container 55 is carried out. The inert gas 50 required for this is provided by means of the process gas atmosphere of the filter chamber 40. Thus, in regular operation, the collecting container 55 is automatically filled with inert gas 50.

The collecting container 55 is then closed in a gas-tight and particle-tight manner by means of the first bulkhead 55a, so that the particles 51 in the collecting container are enclosed by the inert gas 50. Preferably, the filter chamber 40 is also closed in a gas-tight and particle-tight manner by means of the second bulkhead 40a and then the collecting container 55 is removed from the process gas cleaning device 100 by separating the coupling mechanism 43. In order to collect the particles 51 appropriately, as soon as possible, another compatible collecting container 55 is provided and coupled to the process gas cleaning device 100 to change it. Before the new collecting container 55 is coupled to the process gas cleaning device 100, however, it can firstly be filled with the respective process gas in order to avoid compromising the process gas atmosphere in the process gas cleaning device 100 or the laser melting device 1.

In particular, in the case of the sequentially executed cleaning steps F1, F2, F3, F4, the removal of the collecting container 55 is chronologically independent of the cleaning steps F1, F2, F3, F4. Thus, it can be carried out between any cleaning steps, but also during any cleaning step, so that the process gas cleaning device 100 can operate without interruptions.

Even when the filter units 41 are kept operationally by means of the cleaning steps F1, F2, F3, F4 for as long as possible, if required, for more thorough cleaning or maintenance it may be necessary to remove the filter units 41 from the process gas cleaning device 100 as well. This is carried out in step FE, which will now be described in detail with the aid of FIG. 5.

Figure 5:
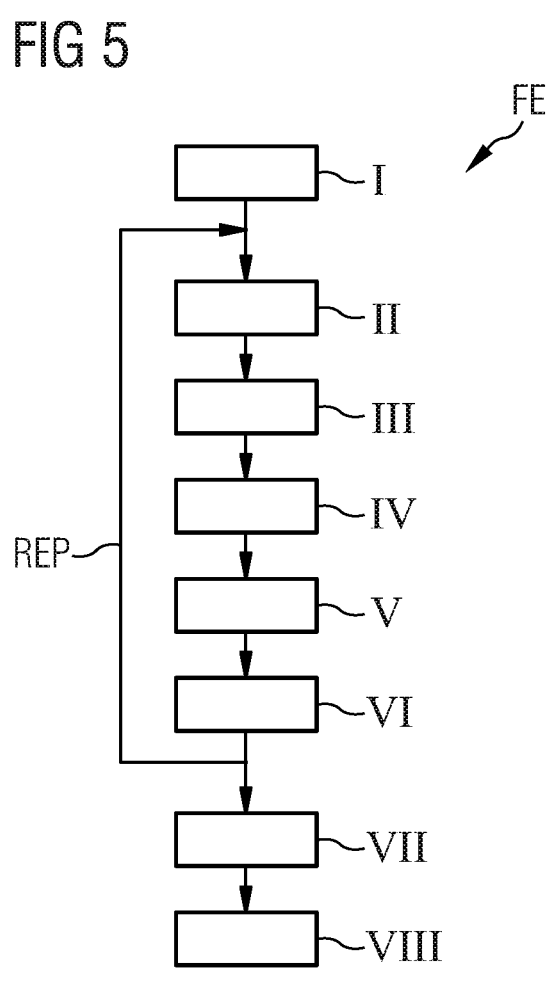
FIG. 5 shows a diagrammatic flow chart of an exemplary embodiment of a method for the removal of filter units in accordance with the invention.

FIG. 5 shows an exemplary embodiment of a method in accordance with the invention for the removal of filter units FE as a diagrammatic flowchart. In order to carry out this method, the process gas cleaning device 100 must be taken out of operation and opened in a first step I in order to gain access to the filter units 41. During opening and when open, oxygen from the ambient air could already penetrate into the process gas cleaning device 100 and react with the particles adhering to the filter units 41.

Thus, in a step II, a first connecting piece 200, 200a, 200b of an inerting device 240, 200c, 200d preferably in accordance with the invention is placed on one of the filter units 41 and locked in a gas-tight manner. Various first connecting pieces 200, 200a, 200b of the inerting device 240, 200c, 200d will be described in more detail with the aid of FIGS. 6 to 11.

In an immediate subsequent step III, by means of a gas supply of the inerting device 240, flushing of the connected filter unit 41 with inert gas commences. In this regard, the inert gas is preferably applied to an inner chamber of the filter unit 41 so that it passes through the structure of the individual filter elements from the inside to the outside and encloses the particles 51 adhering thereto in a cloud. In the case of a filter unit 41 with a plastic filter element and a filter surface area of 2.4 m$^2$, the inert gas volumetric flow rate is approximately 60 L/min, for example.

As quickly as possible again, in a preferred step IV, the remaining filter units 41 are covered with the aid of second connecting pieces in the form of passive covers so that here too, the ingress of oxygen into the filter chamber 40 or via the hollow filter chamber 40 at the number of any remaining filter units 41 can be reduced or prevented. A cover which maintains a passive atmosphere, i.e. an inert atmosphere, in the filter chamber 40 covers a withdrawal opening (not shown) in an operating position in the filter chamber 40 in a substantially gas-tight manner. Preferably, it forms a friction fit and/or an interlocking fit with the withdrawal opening, which can be released as required. The passive cover may comprise a suitable seal on its underside and handles on its upper side for simpler manipulation.

In a step V, the filter unit 41 together with the first connecting piece 200, 200a, 200b of the inerting device 240, 200c, 200d is carefully removed from the filter chamber 40 and placed in a suitable protective container (not shown). Flushing with the inert gas 250 during this process is maintained and not interrupted. In this manner, at least a portion of the ambient air is forced out of the protective container. As quickly as possible after removing the filter unit 41 from the filter chamber 40, the corresponding withdrawal opening is preferably covered with a passive cover in order to reduce or prevent the ingress of oxygen into the filter chamber 40 at this position as well.

The first connecting piece 200, 200a, 200b of the inerting device 240, 200c, 200d can also preferably be connected in a gas-tight manner to an opening in the protective container by a friction fit or interlocking fit at least in one direction in the protective container. The protective container may have a pressure relief valve (not shown) so that when it is closed in a gas-tight manner, flushing of the filter unit arranged inside it with inert gas can be continued at least periodically. As an alternative, after being closed in a gas-tight manner, the flushing may be adjusted because the gas-tight embodiment prevents the access of ambient oxygen to the particles and the particles are permanently sheathed with inert gas.

In an optional step VI, the filter unit 41 is passivated in the protective container with the aid of a suitable passivation means, for example sand, and can then be transported or further handled substantially without risk.

After being placed in the protective container or after passivation, the lock on the inerting device 240, 200c, 200d can be released. Next, further filter units 41 of the process gas cleaning device 100 can be removed. The steps II to VI are then repeated as required for the other filter units 41. Preferably, the covers on the withdrawal openings of the filter chamber 40 are then removed again in succession.

In a step VII, corresponding to the number of the removed filter units 41 new or recycled filter units 41 are placed in the process gas cleaning device 100. Because these are not loaded with spontaneously combustible particles, working with them is substantially without risk.

In a final step VIII, the process gas cleaning device 100 is closed again, placed under a process gas atmosphere and brought into operation.

Both the removed collecting container 55 and also the removed filter units 41 as well as the separated particles can be recycled or if necessary disposed of in a suitable manner in suitable respective subsequent processes.

Figure 6:
FIG. 6 shows a diagrammatic perspective view of an exemplary embodiment of an inerting device in accordance with the invention.
Figure 7:
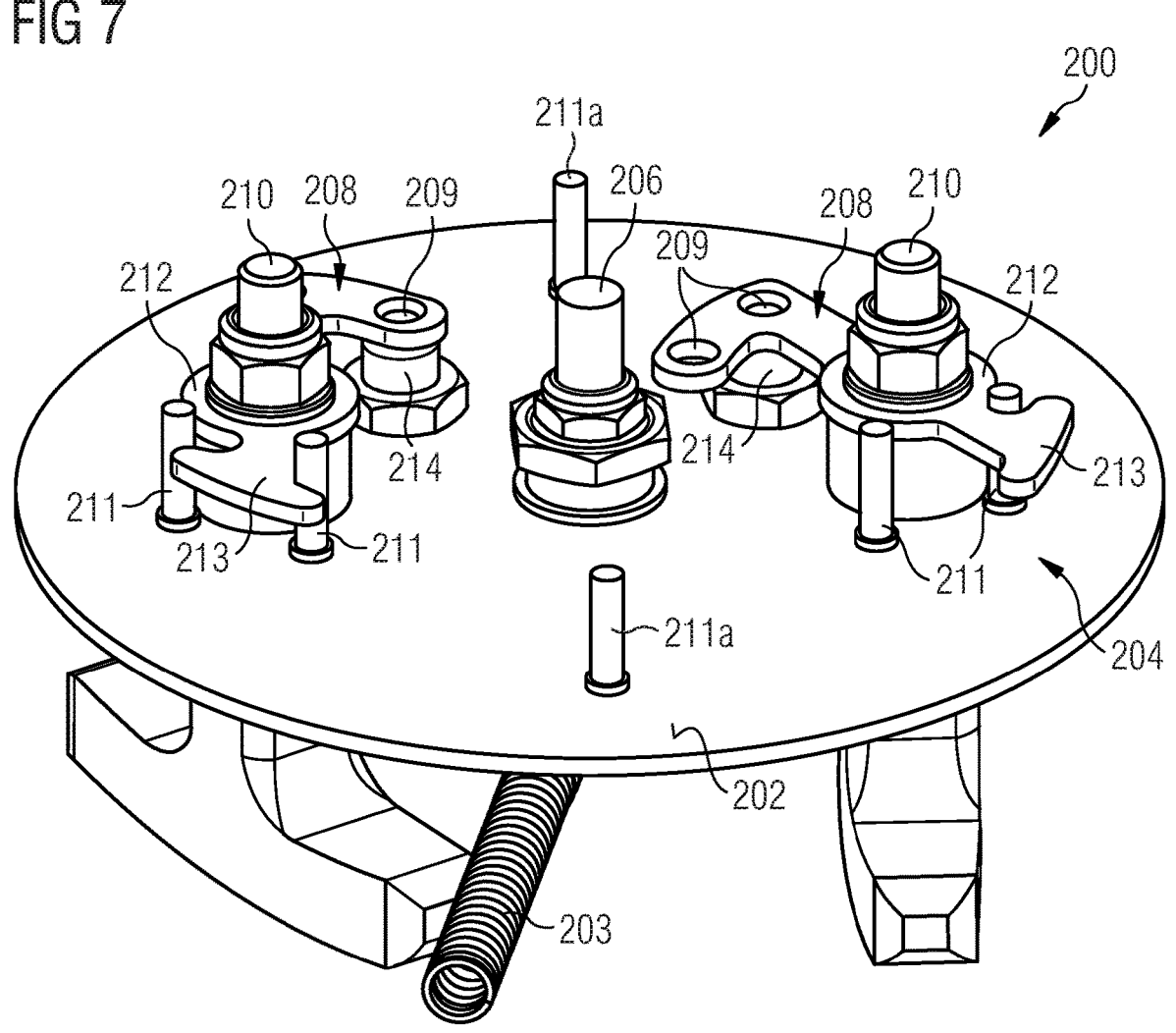
FIG. 7 shows a further diagrammatic perspective view of the inerting device of FIG. 6.

FIGS. 6 and 7 show different perspective views of an exemplary embodiment of an inerting device 240 in accordance with the invention with a first connecting piece 200. The inerting device 240 comprises a first connecting piece 200 as well as an inert gas supply (here shown diagrammatically as the supplied inert gas 250), which is connected to the first connecting piece 200 by means of a flexible tube 203.

=The first connecting piece 200 comprises a circular base plate 204 which acts as a cover for the cartridge-shaped filter unit 41. The base plate 204 has a handle side 201 and a filter side 202. The flexible tube 203 leads onto the handle side 201 into an angled piece 205. The angled piece 205 serves to reduce the build height and is connected to an outflow outlet 206. The outflow outlet 206 passes perpendicular and centrally through the base plate 204 and is fastened or locked with nuts on both sides of the base plate 204.

At the same distance from and on a line with the central point of the base plate, two handles 207 are disposed on the handle side 201 and each are rotatably mounted about their central axis perpendicular to the base plate 204 by means of a respective shaft 210. The shaft 210 is disposed on the central axis of the respective handle 207 and passes through the base plate. It rigidly connects the handles 207 with the hook-shaped twist lock 212, which is disposed on the filter side 202. Turning the handle 207 therefore results in turning the twist lock 212.

The twist locks 212 are respectively formed by an L-shaped hooked end 208 and a T-shaped stop end 213 which are disposed opposite the shaft 210 or the axis of rotation of the handle 207. The twist locks 212 extend substantially parallel to the base plate 204. Two stop pins 211 protrude at right angles out of the base plate 204 and respectively act as stop points for the stop end 213 of the twist lock 212. The stop pins 211 in this regard are disposed in a manner such that they limit the rotation of the twist lock 212 respectively in an interlocking fit in two positions. These end positions for rotation respectively correspond to two catches, which are formed as two circular recesses 209 at the hooked end 208. One recess 209 is respectively disposed here in the region of the angle of the L-shaped hooked end 208. The other recess 209 is disposed in the region of the free end of the free shank of the L-shaped hooked end 208. In the end positions for rotation, a spring loaded locking pin 214 engages in each case in one of the recesses 209 and secures the respective twist lock 212 including the handle in this position from inadvertent actuation. The locking pins 214 are respectively secured on the handle side 201 by means of nuts 217.

In addition, two guide pins 211a are disposed on the filter side of the base plate 204 and are connected to the base plate 204. The guide pins 211a here are disposed in a manner such that when the connecting piece 200 is correctly placed on a filter unit 41, they can be inserted into guide openings in the filter unit 41. In this manner, incorrect rotation of the connecting piece 200 with respect to the filter unit 31 is prevented and in addition, exact positioning of the connecting piece 200 on the filter unit 41 is guaranteed.

Furthermore, on the handle side 201, a ground connection 216 is connected to the vacuum pump 204 in a conductive manner by means of a bracket 215. This means that during their intended use, the first connecting piece 200 and the process gas cleaning device 100 can be brought to the same potential by means of the ground connection 216, and so static discharges the sparks from which could ignite particles 51 deposited on a filter unit, can be avoided.

During its intended use, the L-shaped hooked ends 208 and/or sections of the stop end 213 of the twist lock 212 engage in corresponding recesses of the filter units 41. This means that a strong and rigid connection is produced between the first connecting piece 200 and the filter unit 41. This connection also produces a contact pressure between the first connecting piece 200 and the filter unit 41, so that an opening into an interior space of the filter unit 41 is closed in a gas-tight manner as far as possible by means of the base plate 204, which is self-sealing, or an appropriately disposed seal (not shown).

The flexible tube 203 is appropriately connected to an inert gas storage container. The inert gas storage container may, for example, be a gas bottle or a fixed gas line. In order to regulate the volumetric flow of the inert gas, a pressure reducer, a control valve and/or a manually or electronically adjustable flow regulator is interposed. Furthermore, a cut-off may be installed which limits the time period for feeding in the protective gas in order to eliminate the possibility of suffocation of the personnel—even in the case of incorrect operation.

When being used as intended, the inerting device 240 flushes a connected filter unit 41 with inert gas. The filter unit 41 which has been inerted in this manner can be removed from the process gas cleaning device 100 by personnel by means of the handles 207 without touching the filter unit 41 because of the rigid connection to the inerting device 240.

Figure 8:
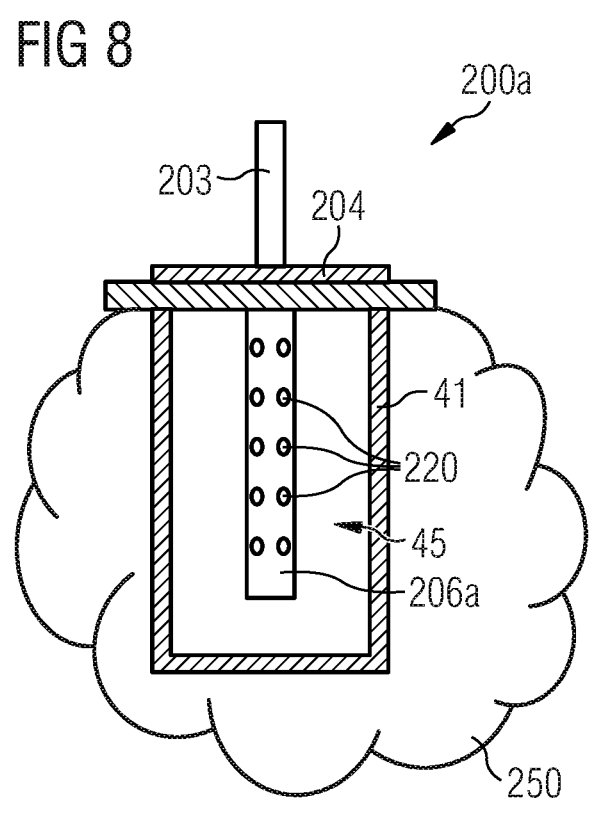
FIG. 8 shows a highly diagrammatic sectional view of a further exemplary embodiment of an inerting device in accordance with the invention which is positioned on a filter unit.

FIG. 8 highly diagrammatically shows a further exemplary embodiment of a first connecting piece 200a of an inerting device 240 in accordance with the invention. The first connecting piece 200a is in principle similar to those shown in FIGS. 6 and 7 and in this case is shown seated on a filter unit 41 during operation. In contrast to the first connecting piece 200 described above, the outflow outlet 206a here is configured as a longer pipe and therefore protrudes further into an interior 45 of the filter 41. In addition, outflow openings 220 are distributed over the length of the outflow outlet 206a, from which outflow openings 220 the inert gas flows out in the radial direction. Firstly, the inert gas fills the filter interior 45 and then flows to the outside through the medium or the structure of the filter elements of the filter unit 41. Because of the homogeneous distribution of the outflow openings 220, a homogeneous distribution of the inert gas cloud can be achieved.

Figure 9:
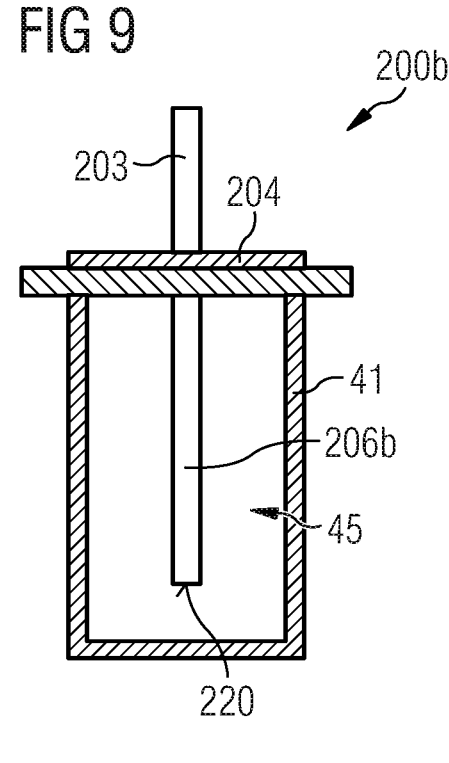
FIG. 9 shows a highly diagrammatic sectional view of a further exemplary embodiment of an inerting device in accordance with the invention.

FIG. 9 highly diagrammatically shows a further exemplary embodiment of a first connecting piece 200b of an inerting device 240 in accordance with the invention which is similar to that of FIG. 8. In contrast to FIG. 8, the outflow outlet 206b here does not have any radial outflow openings 220, but only one outflow opening 220 which opens onto the side of the filter unit 41 opposite to the opening of the filter unit 41. This embodiment of the outflow outlet 206b is advantageous when, because of the arrangement or configuration of the filter unit 41, the particles are primarily deposited at the side of the filter unit 41 which is opposite to the opening of the filter unit 41.

Figure 10:
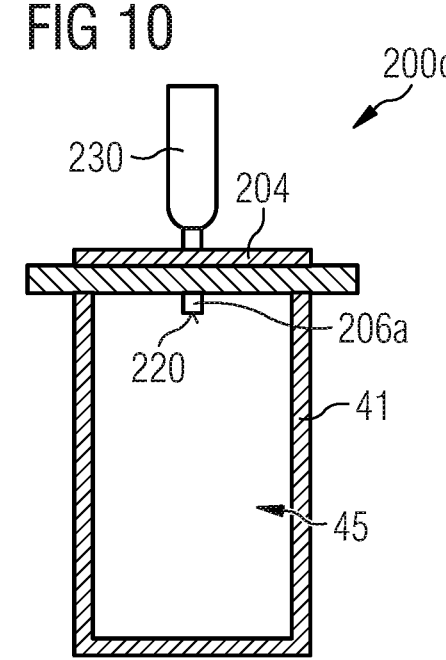
FIG. 10 shows a highly diagrammatic sectional view of a further exemplary embodiment of an inerting device in accordance with the invention with a gas cartridge.

FIG. 10 highly diagrammatically shows an exemplary embodiment of an inerting device 200c in accordance with the invention. The inerting device 200c is similar to the first connecting pieces 200a, 200b described with the aid of FIGS. 8 and 9, but in contrast to these, it has an inert gas supply in the form of a gas cartridge 230. This means that the inerting device 200c here is formed as a unit which can be released when required and which comprises the inert gas supply and the first connecting piece. The gas cartridge 230 here is arranged on the handle side 201 (see FIG. 6) and passes the inert gas through the base plate 204 into the filter interior 45 by means of an outflow outlet 206*c*.

Figure 11:
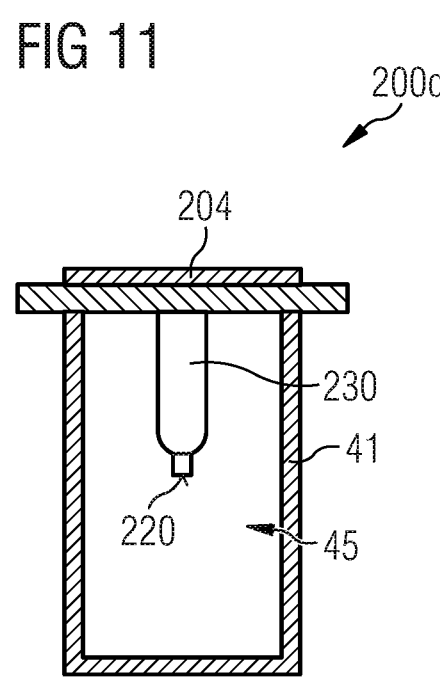
FIG. 11 shows a highly diagrammatic sectional view of a further exemplary embodiment of an inerting device in accordance with the invention with a gas cartridge.

FIG. 11 is similar to FIG. 10 and also shows an exemplary embodiment of an inerting device 200*d* in accordance with the invention. Here, however, in contrast to FIG. 10, the gas cartridge 230 is arranged on the filter side 202 (see FIG. 6) of the base plate 204 of the first connecting piece and protrudes into the interior 45 of the filter. A separate outflow outlet is not implemented here.

Finally, it is indicated once again that the figures described in detail above concern only exemplary embodiments, which can be modified by the person skilled in the art in very different ways without departing from the scope of the invention. Furthermore, the use of the indefinite article "a" or "an" does not exclude the fact that the features concerned could also be present in multiples thereof. Similarly, the terms "unit" "device" or "assembly" do not exclude the fact that these could consist of a plurality of cooperating sub-components which could also be distributed spatially if appropriate.

LIST OF REFERENCE NUMERALS

1 laser melting device
2 object/component
3 process chamber
4 chamber wall
5 container
6 container wall
7 working plane
8 build zone
10 support
11 base plate
12 build platform
13 unconsolidated build material
14 storage container
15 build material
16 recoater
17 radiant heating system
20 irradiation device/illuminating device
21 laser
22 laser beam
23 deflecting device/scanner
24 focusing device
25 coupling window
29 control unit
31 process gas infeed
40 filter chamber
40*a* second bulkhead
41 filter unit/permanent filter
42 pipe
43 coupling mechanism
45 filter interior
50 process gas
51 particles
52 infeed
53 process gas outlet
54 clean gas outlet
55 collecting container
55*a* first bulkhead
56 cleaning unit
100 process gas cleaning device
200, 200*a*, 200*b* connecting piece
201 handle side

202 filter side
203 tube
204 base plate
205 angled piece
206, 206*a*, 206*b*, 206*c* outflow outlets
207 handle
208 hooked end
209 recess
210 shaft
211 stop pin
211*a* guide pin
212 twist lock
213 stop end
214 locking pin
215 bracket
216 earth connection
217 nut
220 outflow opening
230 gas cartridge
240, 200*c*, 200*d* inerting device
250 inert gas cloud
F1, F2, F3, F4 cleaning step
FE removal of filter unit(s)
H horizontal direction
PAB removal of collecting container
REP repeat
V vertical direction
I, II, . . . , VIII steps of method

The invention claimed is:

1. A method for the removal of a first filter unit of a particle collecting device of a powder bed based additive manufacturing apparatus, the first filter unit receiving highly flammable particles entrained in a process gas feed from a build chamber, the method comprising the following steps:
   a) providing a container within which the first filter unit is located during use of the additive manufacturing apparatus;
   b) providing an inert gas supply to an interior space formed within the first filter unit and generating a positive pressure within the interior space relative to an outside to the first filter unit; and
   c) removing the first filter unit from the container so that the particles attached to the first filter unit remain enclosed in the inert gas within the filter interior space through a flushing action with the inert gas during removal.

2. The method of claim 1, wherein a flow rate through an area of the first filter unit is at least 0.1 m/s; and/or at most 5 m/s.

3. The method of claim 1, wherein the flushing with the inert gas is carried out with the aid of an inerting device which is suitable for the first filter unit.

4. The method of claim 1, wherein the particle collecting device comprises at least one second filter unit which is at least periodically isolated from an ambient atmosphere during removal of the first filter unit.

5. The method of claim 1, wherein the particle collecting device comprises a collecting container which is filled with the particles and in which, during or prior to the removal, the inert gas and the particles are sealed against an ingress of gas.

6. The method of claim 5, wherein at least part of the removal of the collecting container is also carried out during a separation procedure, wherein the particles are collected in an intermediate container and the process gas cleaning device is operated without interruption.

7. The method of claim 1, wherein the method is carried out after a plurality of separation procedures.

8. The method of claim 1, wherein the inert gas has a fraction of nitrogen and/or a fraction of argon of at least 45%.

9. The method of claim 1 wherein, after removal, a part of the particle collecting device and/or collected particles are disposed of or recycled.

10. An inerting device for a first filter unit of a process gas cleaning device of a powder bed based additive manufacturing apparatus, the first filter unit receiving highly flammable particles entrained in a process gas feed from a build chamber, the particles being highly flammable, the first filter unit including a filter housing with enclosing sidewalls, a top to the sidewalls and a bottom to the sidewalls, the filter housing constituting a container within which the first filter unit is located in an interior of the container, the first filter unit having a top opening and filter sidewalls extending from around the top opening defining a filter interior space, the inerting device comprising:

a connecting piece adapted to be fitted on the top opening in a gas tight fit, the fit being effected using at least one handle rotatably mounted on a connecting piece exterior, the handle having a stem extending through the connecting piece from the exterior through the connecting piece to a connecting piece side that is in the filter interior space when the connecting piece is emplaced, the stem having an element that engages with filter sidewalls to fix the connecting piece in place on the top opening; and an inert gas inlet in the connecting piece for an inert gas supply connectable to the inert gas inlet, wherein the first filter unit is removable from the container using the at least one handle with the connecting piece emplaced, a volume of inert gas being admitted to a first filter interior space and encompassing the first filter element therein through outgassing from the interior space during removal of the filter from the container.

11. The inerting device of claim 10, wherein the connecting piece can be moved in at least one region with respect to the process gas cleaning device and the inert gas supply is provided by a flexible tube or a gas cartridge.

12. The inerting device of claim 10, further comprising an outflow outlet with a plurality of outflow openings, wherein a number and disposition of the outflow openings are matched to the geometry of the first filter unit.

13. The inerting device of claim 10 for the first filter unit and at least one second filter unit of a process gas cleaning device, the second filter unit being loaded with at least highly flammable particles, the inerting device further comprising a gas-tight second connecting piece adapted for the second filter unit for at least periodical isolation of the second filter unit from an ambient atmosphere during the removal of the first filter unit.

14. A machine park with the inerting device of claim 10.

15. The machine park of claim 14, with at least one additive manufacturing device which comprises a process gas cleaning device with a removable collecting container for at least highly flammable particles which are separated out in the process gas cleaning device, wherein the collecting container has a gas-tight first bulkhead which is configured to enclose the particles with an inert gas when removing the collecting container.

16. The machine park of claim 14, wherein the process gas cleaning device comprises a separation opening and a gas-tight second bulkhead which is configured to close the separation opening during or prior to the removal of the collecting container.

17. A system comprising:

the inerting device of claim 10 associated with the first filter unit;

a second filter unit; and a second inerting device associated with the second filter unit.

18. The inerting device of claim 10, further including a grounding connection on the connecting piece which receives a ground wire extending from a ground source.

19. The method of claim 1, wherein the container remains in place in the additive manufacturing apparatus during removal of the first filter unit, and further including valves that are operated during the removal of the first filter unit to isolate the container from the process gas feed.

20. The method of claim 1, further comprising providing a used filter storage unit that remains under pressure of the inert gas from removal from the container through to insertion into the used filter storage unit.

* * * * *